US005621957A

United States Patent [19]
Herrera et al.

[11] Patent Number: 5,621,957
[45] Date of Patent: Apr. 22, 1997

[54] ARROWHEAD EXTRACTION TOOL

[76] Inventors: Robert C. Herrera; Lillian M. Herrera, both of 9710 Sombrero Loop NE., Albuquerque, N.M. 87113

[21] Appl. No.: 508,627

[22] Filed: Jul. 28, 1995

[51] Int. Cl.[6] .......... B23P 19/04
[52] U.S. Cl. .......... 29/264
[58] Field of Search .......... 29/264, 256, 263, 29/266, 259

[56] References Cited

U.S. PATENT DOCUMENTS

| | | | |
|---|---|---|---|
| 1,865,420 | 6/1932 | Kick | 29/264 |
| 2,591,451 | 4/1952 | Lynch et al. | 29/264 |
| 2,650,419 | 9/1953 | Barbisch | 29/266 |
| 3,599,311 | 8/1971 | Ellis | 29/266 |
| 4,057,889 | 11/1977 | Ferguson | 29/266 |
| 4,633,562 | 1/1987 | Ulsh | 29/264 |
| 4,982,493 | 1/1991 | Wendt | 29/264 |
| 5,408,734 | 4/1995 | Mills et al. | 29/264 |
| 5,416,963 | 5/1995 | Boynton | 29/264 |

FOREIGN PATENT DOCUMENTS

| | | | |
|---|---|---|---|
| 2567259 | 7/1984 | France | 29/266 |

*Primary Examiner*—Robert C. Watson
*Attorney, Agent, or Firm*—Kevin Lynn Wildenstein

[57] ABSTRACT

The present invention relates to an arrowhead extraction tool having an axial thrust mechanism coupled with a leverage plate, and a means for attaching which will couple with a lodged arrowhead embedded in an object. In operation, the present invention engages a lodged arrowhead by means of attaching, and upon rotation of axial thrust members, the leverage plate correspondingly moves in a reverse axial direction away from the object (such as a tree) for the removal of the lodged arrowhead. When the arrowhead is completely dislodged from the object, it can be disengaged from the means for attaching, and if desired, the hunter can continue to use the previously lodged arrowhead.

3 Claims, 2 Drawing Sheets

ARROWHEAD EXTRACTION TOOL

FIELD OF THE INVENTION

This invention relates to a portable arrowhead extraction tool for the removal of lodged arrowheads in tree trunks, tree stumps, fence posts and like objects by employing at least two continuous axial thrust members against such an object while simultaneously providing a reverse pull on the arrowhead in order to remove the arrowhead from a lodged position.

BACKGROUND OF THE INVENTION

In bow and arrow sports, typical arrows include two separate components—the arrow shaft and the arrowhead. Today, arrows are manufactured so that the arrowheads can be separated from the arrow shaft. This separate structure is an important design consideration if the arrowhead ultimately becomes embedded in a tree or like structure. As such, arrowheads are designed with an externally threaded portion at the arrowhead stem opposite the sharp arrowhead point such that the threaded portion is suitable for engagement with an internally threaded arrow shaft. This technology is well known in the art, as is seen in U.S. Pat. No. 3,401,938.

Sportsmen enjoy using a bow and arrow for its utility, either while hunting or for sport. During practice or competitive events, sportsmen aim a bow and arrow at a tree structure, a tree stump or like object, with the intention of shooting the arrow into such an object. Due to the overwhelming speed, momentum and force of the arrow as the arrowhead point enters the object, the arrowhead embeds itself deeply into the object and is extremely difficult to remove without severely damaging the arrowhead. Many times, the arrow shaft is unscrewed from the arrowhead and the arrowhead is simply left in the tree. If an arrowhead is left embedded in the tree, it presents a dangerous hazard, especially to curious children.

Even if the arrowhead is capable of removal, there exists the possibility of damage to the arrowhead as well as to the trees during the removal process due to extreme bending and twisting. Since arrowheads are expensive and are usually half the cost of the complete arrow, hunters and sportsmen desire an arrowhead extraction tool which can easily remove the embedded arrowhead without damaging the arrowhead. In this regard, the arrowhead can be used repeatedly without the need to purchase additional arrowheads.

Prior to the introduction of arrowhead extraction tools, hunters used conventional tools such as pliers, knives and screwdrivers to dig, pull or pry the embedded arrowheads from the tree. However, because arrowheads are usually formed of a plurality of extremely sharp blades at one end, hunters run the risk of serious bodily injury when attempting to remove an embedded arrowhead by conventional means. Even if the arrowhead does not include any sharp edges, the removal of an embedded arrowhead by conventional means may result in damage to the arrowhead. Clearly, use of conventional tools to remove an arrowhead is time consuming, hazardous and arduous.

Before to the present invention, the art relied on several extraction methods in order to remove an embedded arrowhead. Extraction tools, such as that to U.S. Pat. arrowhead is embedded deeply in a tree structure, such a tool may damage or bend the arrowhead due to the extreme torsion which must be applied to the arrowhead. Similarly, U.S. Pat. No. 4,169,454 also teaches an arrowhead extractor which requires the prying and/or rocking of the arrowhead to loosen it from its lodged position. Naturally, this bending and twisting may result in a damaged arrowhead and is therefore inadequate.

U.S. Pat. No. 4,043,020 teaches an extraction tool which employs a slide percussion method of extracting an embedded arrowhead. In this patent, the tool comprises a linear housing which is slidable upon a shaft attached to the embedded arrowhead, which, when repeatedly and reciprocatively slid upon the shaft, attempts to remove the embedded arrowhead. Several adaptations of this "sliding" method of arrowhead extraction exists, including a linearly slidable housing in U.S. Pat. No. 4,150,469; a reciprocating slide weight in U.S. Pat. No. 4,957,095 and U.S. Pat. No. 4,478,204; a slidable hammer in U.S. Pat. No. 4,387,697, U.S. Pat. No. 4,907,567, U.S. Pat. No. 4,478,204 and U.S. Pat. No. 4,957,095; and a reciprocating weight in U.S. Pat. No. 4,584,983. In each of these patents, it is taught to use slidable means disposed on a shaft which is moved in a linear direction upon a shaft to disengage or extract an embedded arrowhead. In many of these patents, the slidable means forms a component of the bow, and therefore, when an arrowhead is embedded, the hunter is required to disassemble the bow in order to employ the slidable extractor tool.

In contrast to the prior art, the present invention does not require the use of a slidable housing, weight, anvil, hammer or any type of repetitive impact force to extract an embedded arrowhead. The present invention employs a continuous axial thrust member against the object in which the arrowhead is lodged (such as a tree) while simultaneously providing a reverse pull on the arrowhead in order to remove the arrowhead from its lodged position. Moreover, because the present invention is a separate component, it is portable and does not require any disassembly of the bow.

Accordingly, it is an object of the present invention to provide a arrowhead extraction tool which can easily remove an embedded arrowhead from a tree or like structure without damaging the arrowhead.

It is a further object of the present invention to provide an arrowhead extraction tool which extracts a lodged arrowhead through a continuous axial thrust in the direction of the tree, while simultaneously employing a reverse pull on the arrowhead to extract the arrowhead from its lodged position.

It is an object of the present invention to provide a leverage plate and means for attaching a lodged arrowhead, that when used in conjunction with a means for providing axial thrust, removes an arrowhead from its lodged position.

It is also an object of the present invention to provide an arrowhead extraction tool which is portable and therefore does not require disassembly of a bow.

This invention improves the ability to effectively, rapidly and easily remove an embedded arrowhead from a tree or like structure without repetitive reciprocal movements and reduces the cost-prohibitive replacement of arrowheads due to damage where, without applicant's extraction tool, arrowheads are incapable of replacement.

SUMMARY OF THE INVENTION

The present invention relates to an arrowhead extraction tool. Specifically, the arrowhead extraction tool uses an axial thrust mechanism attached with a leverage plate which, when operated, couples to a lodged arrowhead within an object and provides axial thrust against the object (such as a tree) for the removal of the lodged arrowhead. The present invention also includes a means for attaching the tool to the lodged arrowhead. When the arrowhead is completely dislodged from the object, it can be disengaged from the means for attaching, and if desired, the hunter can continue to use the previously lodged arrowhead.

DESCRIPTION OF THE PREFERRED EMBODIMENT

Figure 1:
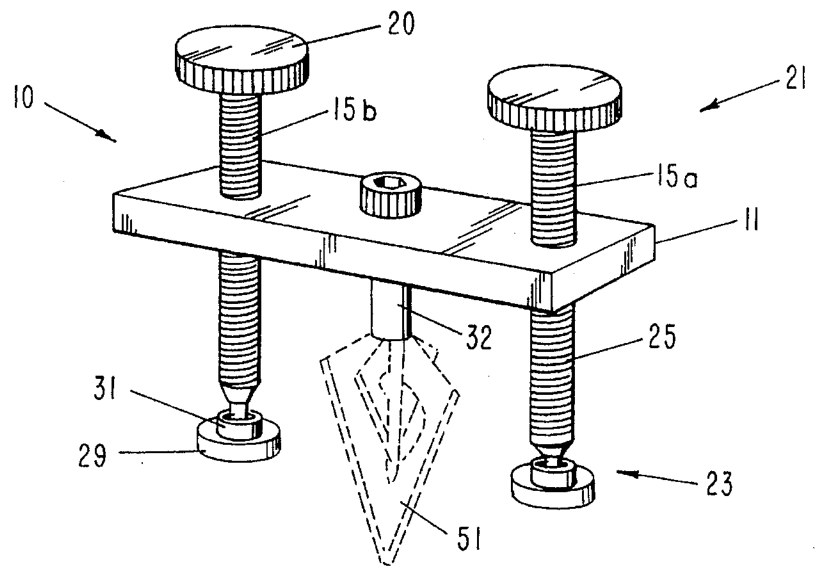
FIG. 1 is a side perspective view of the present invention when coupled with an arrowhead.

The preferred embodiment of the present invention is seen in FIG. 1. As shown, the arrowhead extraction tool 10 consists of a relatively flat, but rigid, leverage plate 11 which has an opening 13 substantially in a coordinate center. In the preferred embodiment, leverage plate 11 also has two openings **14*a* and 14*b* disposed on opposite ends of plate 11. Each of leverage plate openings 14*a* and 14*b*** are formed with internal threads.

Figure 2:
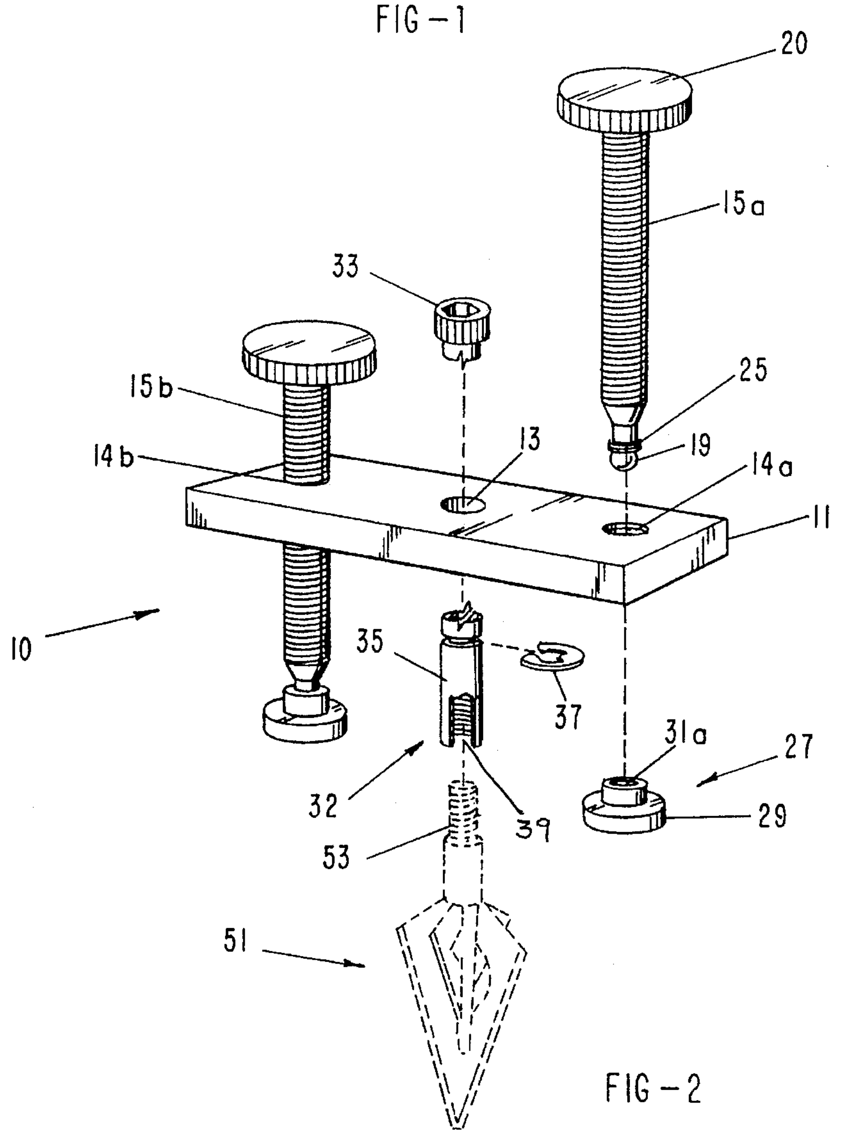
FIG. 2 is a side perspective view of the present invention with an exploded component part.
Figure 4:
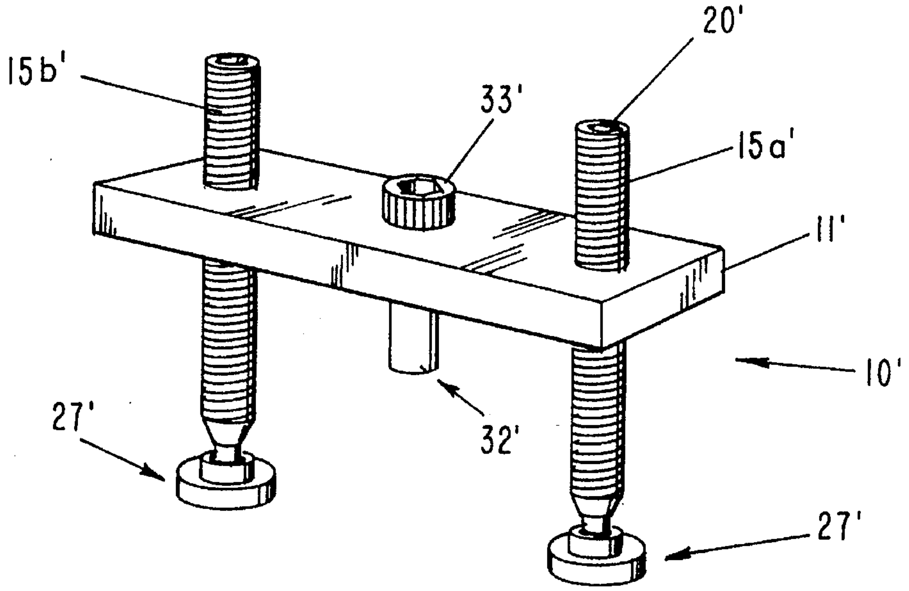
FIG. 4 is an alternate embodiment of the present invention.

Axial thrust force members **15*a* and 15*b* are equivalent structures, with each member formed of rigid matter such as metal or like rigid material and at least 2.0 inches long. Each axial thrust force member 15*a* and 15*b* is formed with external threads and is of sufficient circumference as to engage the two leverage plate openings 14*a* and 14*b*. Each axial thrust force member has a first end 21 and a second end 23. As shown in FIGS. 1 and 2, axial thrust force members 15*a* and 15*b* have a cylindrical friction knob 20 integrally formed at first end 21. In the preferred embodiment, axial thrust force members 15*a* and 15*b* both have friction knob 20, but those skilled in the art will appreciate that knob 20 can be replaced by an opening 20' (as seen in FIG. 4) formed within each axial thrust member and having internal threads in order to engage any type of hex or Allen wrench (not shown). The exact formation of opening 20'** is purely a design choice, and does not depart from the scope and spirit of the present invention.

As seen in FIGS. 1 and 2, circumferentially circular sphere 19 is integrally formed at axial thrust member's second end 21. Radial threading groves 25 are formed upon the external surface of sphere 19. In order to provide a thrust force in an axial reverse direction of the arrowhead's entry into the tree, a rigid structure is required which has sufficient surface contact with the tree but which will not substantially penetrate or harm the tree's external surface. As seen in FIG. 2, a surface thrusting means 27 having a generally circular formation is shown. Surface thrusting means is formed from a rigid and sturdy material such as metal or like compound. Surface thrusting means 27 includes a thrusting disk 29 integrally formed with a cylindrical stem 31. In use, a bottom portion of thrusting disk 29 engages the surface of the object which embeds the lodged arrowhead 51, while cylindrical stem 31 has an internally threaded stem hole **31*a*. The internal threads of stem hole 31*a* are adapted to engage the radial threading groves 25 of sphere 19 such that the surface thrusting means 27 is rotatably coupled to the axial thrusting member's second end 23**.

As seen in FIGS. 1 and 2, an attaching member 32 is shown having a head 33 at one end which is wider in diameter than leverage plate opening 13, and also having an integrally formed cylindrical stem 35 at another end. Stem 35 is smaller in diameter than leverage plate opening 13, and therefore, is capable of free rotation within leverage plate opening 13. Because the attaching member is not fixedly attached to the leverage plate along any point, a retaining clip 37 is employed. In this embodiment, retaining clip 37 allows the free rotation of attaching member 32 within leverage plate opening 13 without the risk that the attachment member will fall out or remove itself from leverage plate 11. As with the other components of the present invention, attaching member 32 is formed from a sturdy, yet rigid compound, such as metal or like material.

As seen in FIG. 2, an attaching opening 39 is formed at one end of stem 35. Attaching opening 39 is internally threaded to engage an arrowhead's externally threaded stem portion 53. Further, because attaching member 31 freely rotates within leverage plate opening 13, attaching opening 39 is capable of securely coupling with a lodged arrowhead in order to remove the arrowhead 51 from its lodged position.

In operation, axial thrust members **15*a* and 15*b* are operated and rotated clockwise until leverage plate 11 is adjacent to both of the thrust member's second end 23. At this point, stem 35 from attaching means 31 sufficiently protrudes past both attaching member heads to contact arrowhead stem 53. A hunter can then sufficiently screw attaching member head 39 on to the lodged arrowhead's stem portion 53 in secure fashion. When screwing is complete, the hunter can then reverse the direction of axial thrust members 15*a* and 15*b* (e.g., counter-clockwise) by use of an operator key, such as depicted at item 20 in FIG. 2. As those skilled in the art can appreciate, there are numerous operating keys available which can be used to turn thrust members 15*a* and 15*b*, including a hex allen wrench. Hex allen wrenches are commonly employed by bow hunters for adjustment to their bow equipment, and as such, can be employed to operate socket 20' as seen in FIG. 4**.

Figure 3:
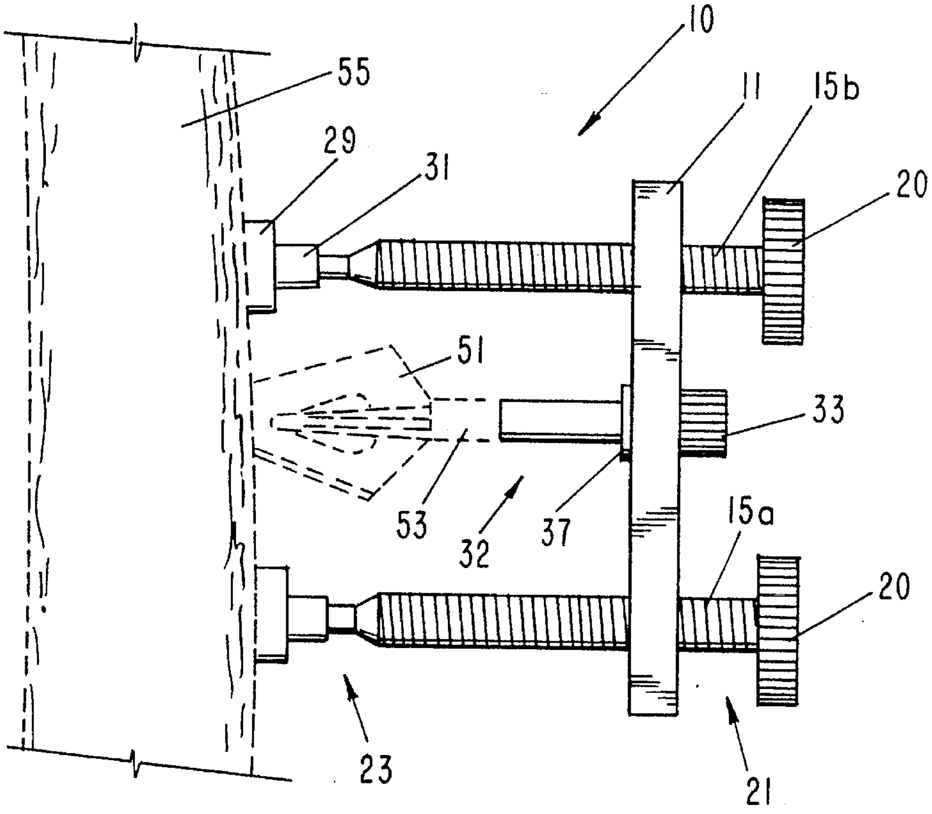
FIG. 3 is a side view of the present invention.

As both axial thrust members **15*a* and 15*b* are rotated in reverse direction, leverage plate 11 correspondingly moves in a reverse axial direction toward thrust member's first ends 21. In like fashion, lodged arrowhead 51, which is securely coupled to attaching means 32, will be pulled in a substantially reverse axial direction than its original entry direction into the tree. Depending on the depth of lodged arrowhead 51 into tree 55, (as seen in FIG. 3) multiple rotations of axial thrust members 15*a* and 15*b* may be required in order to completely dislodge embedded arrowhead 51. When arrowhead 51 is completely dislodged, the hunter can then unscrew attaching member 32 from arrowhead stem 53 and if desired, continue to use the previously lodged arrowhead 51**.

Whereas the drawings and accompanying description have shown and described the preferred embodiment of the present invention, it should be apparent to those skilled in the art that various changes may be made in the form of the invention without affecting the scope thereof.

I claim:

1. An arrowhead extraction tool comprising:

a. a leverage plate having a first aperture disposed substantially in a coordinate center of said leverage plate, said leverage plate further having a first end and a second end;

b. adjustable means for providing an axial thrust disposed adjacent to said leverage plate's first and second ends;

c. means for attaching a lodged arrowhead, said means for attaching structurally communicating with said means for providing axial thrust, said means for attaching further comprises an attaching member having an integrally formed head at one end and means for coupling an arrowhead at another end, said head being larger than said first aperture, said attaching member having an external groove formed circumferentially which is positioned along said attaching member adjacent to said leverage plate, said groove adapted to engage a means for retaining said head rotatably communicating with said means for coupling to engage said lodged arrowhead, whereby upon operation of said means for providing axial thrust, said means for attaching engages externally threaded portion of a lodged arrowhead and extracts said arrowhead from its lodged position.

2. The arrowhead extraction tool of claim 1 wherein said means for coupling further comprises an internally threaded aperture formed within an end of said attaching member to engage an externally threaded end of an arrowhead.

3. The arrowhead extraction tool of claim 1 wherein said means for retaining is a retaining clip.

* * * * *